United States Patent [19]

Heilman

[11] Patent Number: 4,543,814
[45] Date of Patent: Oct. 1, 1985

[54] DEVICE FOR CALIBRATING TORQUE TRANSDUCERS

[75] Inventor: Gregory P. Heilman, Birmingham, Mich.

[73] Assignee: Eaton Corporation, Cleveland, Ohio

[21] Appl. No.: 589,245

[22] Filed: Mar. 9, 1984

[51] Int. Cl.[4] .............................................. G01L 25/00
[52] U.S. Cl. .................................... 73/1 C; 73/862.08
[58] Field of Search ............................ 73/1 C, 862.08

[56] References Cited

U.S. PATENT DOCUMENTS 2,342,919  2/1944  Chapman ............................... 73/1 C
3,050,978  8/1962  Livermont ............................ 73/1 C Primary Examiner—Charles A. Ruehl
Attorney, Agent, or Firm—C. H. Grace; A. E. Chrow

[57] ABSTRACT

A calibration stand for electrical torque transducers capable of applying torque loads on the order of 300,000 inch-pounds (33,900 newton-meters) has deadweight loading applied through a thin flat high carbon steel hangar strap. The hangar strap contacts the end of the load moment beam on a curved surface having a constant radius of curvature equal to the distance of the surface from the beam torque axis. As the transducer deflects under increasing deadweight loading on the hangar strap, the load moment beam rotates and the strap remains vertical and contacts the loading surface along a moving tangent point which has a precise constant distance from the torque axis for providing a high degree of accuracy.

8 Claims, 3 Drawing Figures

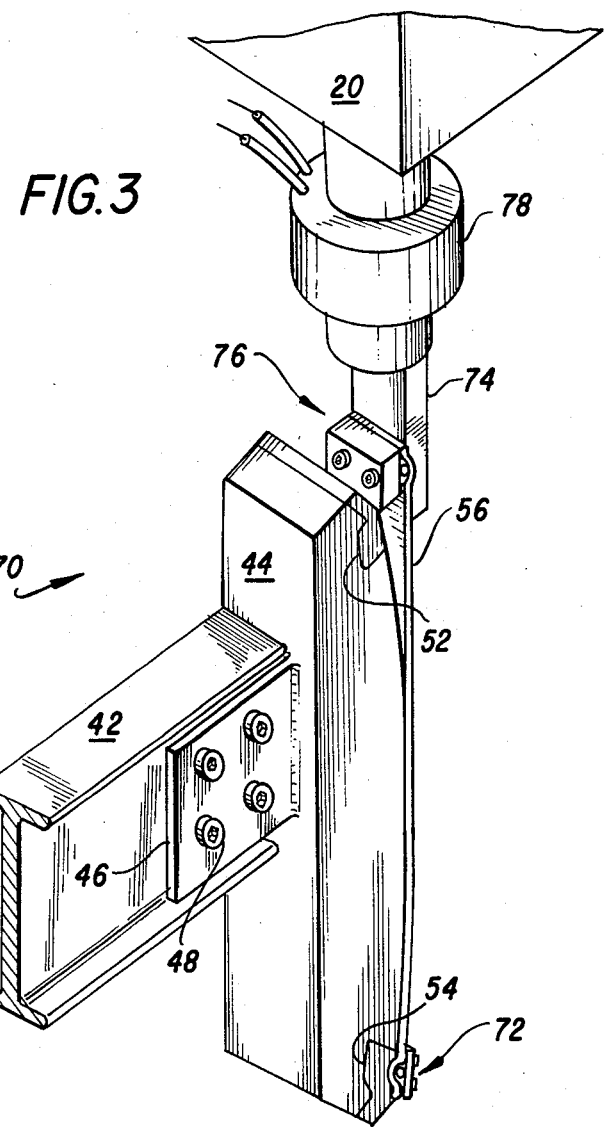

DEVICE FOR CALIBRATING TORQUE TRANSDUCERS

BACKGROUND OF THE INVENTION

The present invention relates to laboratory calibration of electrical transducers of the type employed for providing an electrical signal indicative of moment or torque load applied to a shaft. Such transducers are widely employed for in-service indication of torque loads applied to shafts in machinery, drive mechanisms, and machine tools. Typically, such transducers are of the type employing electrical resistance strain gauges bonded to a strain sensitive member connected between the torque input and output members of the transducer.

Transducers of the aforesaid type are often required to maintain an accuracy of a one tenth of one percent (0.10%) and in some application one-twentieth of a percent 0.05% of full-scale reading for the range of torque loads the transducer is intended to measure. It will be seen that calibration of such a transducer against known or reference torque loads must be extremely precise in order to determine if the transducer is capable of the desired accuracy over its measurement range.

The aforesaid type torque transducers are employed in some applications to measure very high torque loadings in the order of 300,000 inch-pounds (33,900 newton-meters). However, it has been found quite difficult to apply such high torque in the laboratory with the necessary degree of precision required for calibrating a torque transducer.

This difficulty will be better appreciated by way of example in which a moment arm beam having a length of 120 inches (305 cm) is loaded at the end thereof by precision weights which are applied in increments ranging from 0 to 1,000 pounds (454.5 kilograms). In order to obtain the desired accuracy of calibration of the transducer, the 120 inch moment arm of the loading beam at the point of load attachment must not vary during calibration testing by more than 1 milli-inch (0.0254 millimeters).

Where pinned or knife-edge weight hangers are employed for the loading of the moment arm, or beam, it will be seen that a slight amount of rotation of the horizontally disposed moment beam, with the weight hangers maintaining a vertical orientation under gravitational forces, causes a shortening of the effective moment arm. The amount of shortening is equal to the length of the moment arm, to the point of weight attachment, multiplied by the sine of the angle of rotation. Alternatively, the effective moment arm is equal to the moment beam length, at point of weight hangar attachment, multiplied by the cosine of the angle of beam rotation.

Shortening of the effective moment arm by only a small angle of rotation can thus produce an error in the applied moment or torque by an amount which exceeds the permissible deviation and results in inaccurate loading of the transducer during calibration. Heretofore, with pinned or knife-edge weight hangars, in order to eliminate this shortening of the moment arm, it has been necessary to level the moment arm after the application of each increment of deadweight load by rotation of the reaction member attached to the opposite end of the loaded transducer to accommodate the rotational deflection of the transducer. This has resulted in a time-consuming and thus costly procedure for calibrating torque transducers for use in measuring high torque loadings.

Thus it has long been desired to find a way or means of precisely calibrating an electrical torque transducer in the laboratory where very high torque loading is required, and to provide such calibration by incremental loading without the necessity of "zeroing" or re-leveling the calibrating beam with each increment of load.

SUMMARY OF THE INVENTION

The present invention provides a novel and unique way of calibrating electrical torque transducers in the laboratory with a high degree of precision in circumstances where very large torque loading must be applied to the transducer for full-scale calibration. The present invention provides for deadweight loading of a moment arm or beam incrementally with precision laboratory dead weights; and, enables the weight to be increased incrementally without the necessity of deflection "zeroing" or re-leveling the horizontally disposed moment beam with each incremental weight application.

The present invention enables the moment arm loading beam of a calibrating stand to rotate by the amount of transducer torsional deflection, with each increment of deadweight load, and yet maintains the effective moment arm constant with variation less than 0.001%.

The present invention employs a unique and novel weight hanging means which provides a loading surface having a constant radius of curvature equal to the desired precise moment arm required for point of load application. The deadweight hanger is attached to the moment beam by friction clamping a flat metal strap to the constant radius loading surface such that the strap is tensioned over the surface by the deadweight load hanger. The tension strap under deadweight load increments makes tangential contact with the curved loading surface at a point movable therealong for the torsion deflected position of the moment arm from the horizontal with each load increment thereby maintaining the precise moment arm constant.

The invention in an alternative embodiment employs a standard laboratory calibrated load cell connected to the strap when deadweight loading is not convenient and the transducer is torqued until a desired tension load is indicated by the load cell. In either embodiment, the attachment of the strap to the curved loading surface employs a novel deformation of the end of the strap to provide flush attachment of the strap to the end of the curved loading surface.

BRIEF DESCRIPTION OF THE DRAWINGS

FIG. 3 is a portion of a view similar to FIG. 1 illustrating an alternate embodiment employing a standard load cell for determining torque loading applied by the hydraulic cylinder.

DETAILED DESCRIPTION

Figure 1:
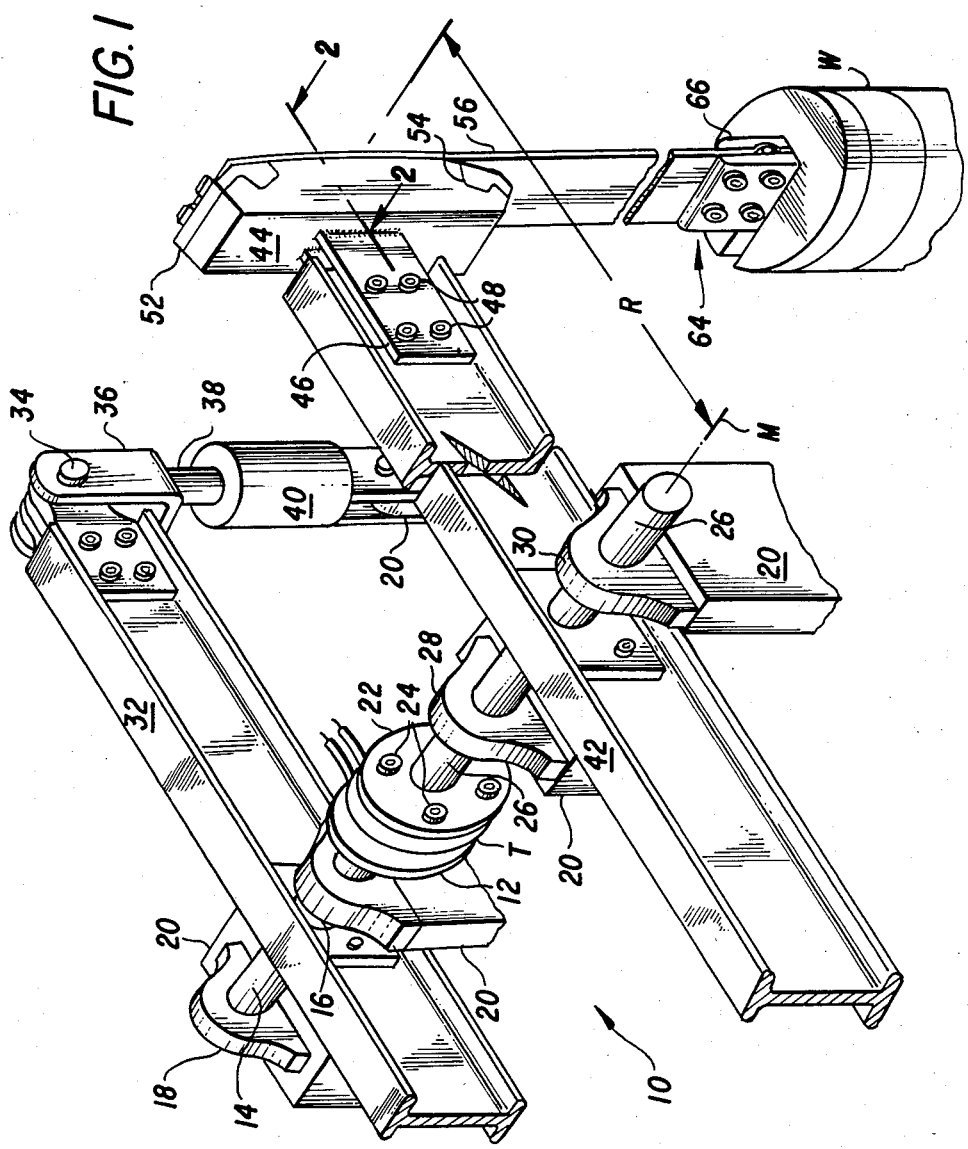
FIG. 1 is a somewhat perspective view of the calibration stand of the present invention with a transducer to be calibrated in place and deadweight loading applied.

Referring now to FIG. 1, the calibration stand of the present invention indicated generally at 10, has a torque transducer indicated by the reference character "T" having the input end thereof attached to a drive flange 12 rigidly connected to torque input shaft 14 which is journaled for rotation in the pair of spaced bearing blocks 16, 18 each of which is mounted to a portion of the base 20. The output end of transducer "T" is connected to flange 22 by suitable fastening means, as for example bolt 24, and the flange is rigidly connected to the end of a torque transmission shaft 26 journaled for rotation in spaced bearing blocks 28, 30, each of which is securred to a portion of base 20. The torque input shaft 14 and transmission shaft 26 are arranged in a precise manner so as to rotate about a common torque axis indicated by the reference character "M".

An input beam or arm 32 is rigidly attached to shaft 14 and extends therefrom at right angles thereto and has the free end thereof attached, by means of pivot pin 34 and clevis 36, to the output rod 38 of a hydraulic cylinder 40 pivotably anchored to a portion of the base 20.

Transmission shaft 26 has rigidly attached thereto a load beam or arm 42 which extends horizontally at right angles to shaft 26 and has a loading block 44 rigidly connected to the free end of beam 42 by any suitable expedient, as for example, welded plates 46 and bolts 48.

Figure 2:
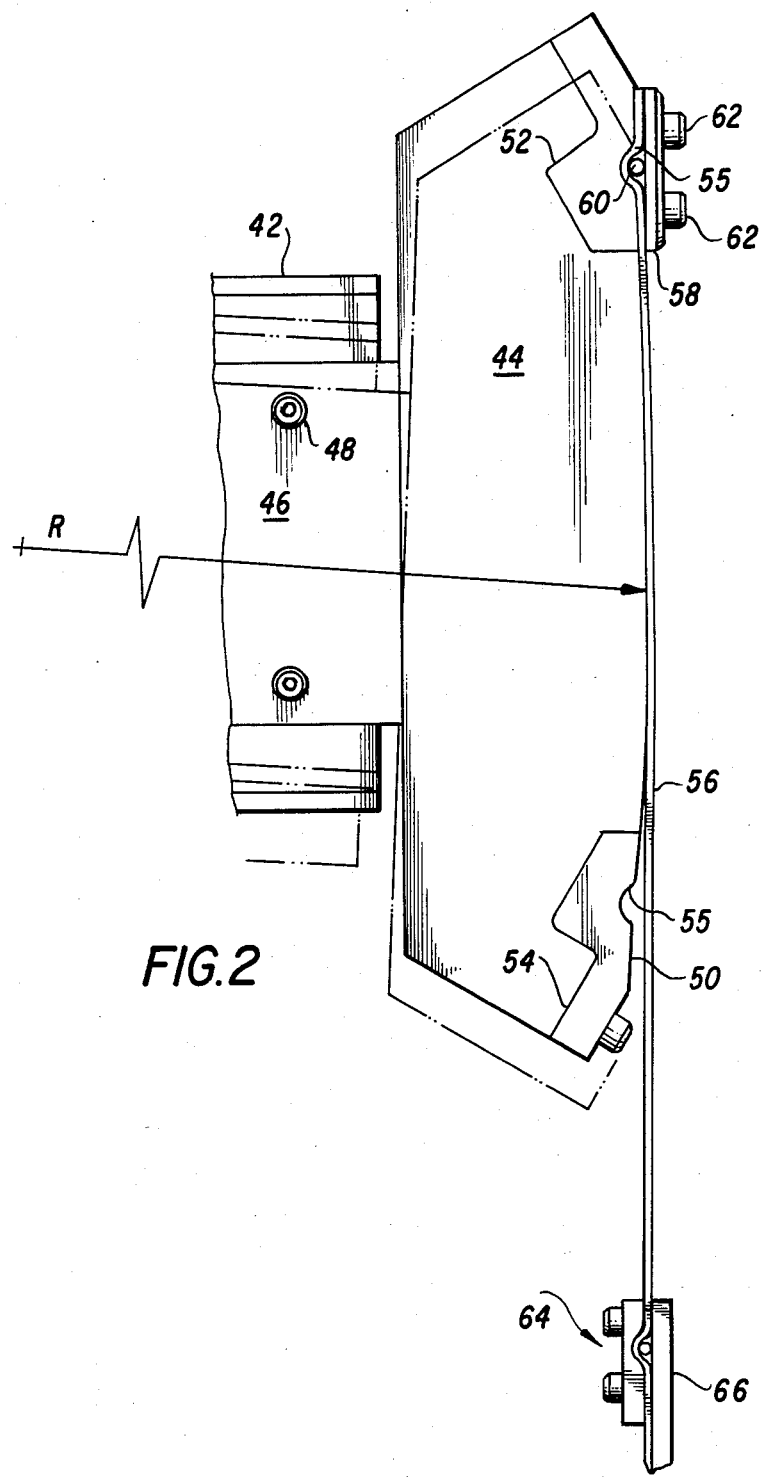
FIG. 2 is an enlarged view taken along section indicating lines 2—2 of FIG. 1.

Referring now to FIG. 2, the block 44 is shown in detail as having a curved loading surface 50 formed thereon having a constant radius of curvature denoted "R" in FIG. 2, which radius of curvature is equal to the distance from the surface 50 to the torque axis "M".

The upper and lower ends of the loading surface 50 are preferably defined by inserts 52, 54 which define secondary engaging surface portions 55 which deviate from the constant radius curvature of the loading surface 50 and preferably comprise curved recesses 55 formed in the surface 50. A tension strap 56 has one end thereof deformed for frictionally engaging the secondary surface 55 at the upper end of block 44 as shown in FIG. 2.

In the presently preferred practice, the local deformation of the strap 56 against engaging surface 55 is accomplished by clamping means comprising plate 58 and cylindrical pin 60, with the plate being retained onto the block and insert 52 by suitable bolts 62. Preferably, the secondary surface portion 55 comprises a rounded groove; however, it will be understood that alternatively the surface portion 55 may comprise a raised area from the loading surface 56 and a corresponding recess in plate 58 or a recess in plate 58 with the pin 60 disposed on the opposite side of strap 56 than illustrated in FIG. 2. The clamping of the plate 58 over the pin 60 and strap 56 thus frictionally engages the strap with the insert 52 for preventing slippage of the strap 56 under tension load.

A similar frictional engaging clamping means, indicated generally at 64, is preferably employed at the lower end of shaft 56 for retaining thereon the deadweight hangar 66.

In the presently preferred practice, the strap 56 comprises a carbon steel strip having a yield stress in excess of 100 KSI (690.0 kilopascals) and has a width to thickness ratio at least 30:1 and preferably 35:1. In the present practice, SAE 1024 steel cold rolled strip was employed having a width of 1¼ inch (31.7 millimeters) and a thickness of 0.031 inch (0.79 millimeter). The thickness of strap 56 is chosen such that the ratio of the radius "R" to thickness "t" (R/t) is greater than 600. In the present practice, it has been found satisfactory to employ values of R/t up to 4000. The strap thus has a high degree of resilient flexibility when tensioned over the loading surface 50. It will be understood by those skilled in the art that minimizing the thickness of the strap reduces the effect of the Poisson strain in changing the thickness of the strap over the loading surface, and thus reduces the changes in the loading radius due to tensile loading of the strap. It has been found satisfactory for a torque test stand capable of applying loads of 300,000 inch-pounds (33,900 Newton meters) to employ a moment arm or loading beam 42 having a length of 120 inches (305 centimeters).

In operation, the hydraulic cylinder 40 is actuated to load input member 32 and rotate load beam 42 to the horizontal. Deadweights, indicated by the reference character "W" in FIG. 1, are added incremetally and the electrical output of transducer "T" is recorded and compared with the known value of the torque produced by the deadweight "W" multiplied by the radius-arm "R".

Referring now to FIG. 2, the deflected position of the moment-beam 42 and block 44 is shown in dashed outline as it appears under the force applied to the strap 56 by the deadweight loading. In the position shown in dashed outline in FIG. 2, it will be apparent that the constant radius curvature of the loading surface 50 enables the tangent point where the strap 56 contacts the loading surface 50 to move upwardly to maintain the strap 56 in true vertical orientation and yet maintain the load moment arm constant at the value of the radius "R".

Referring now to FIG. 3, an alternate embodiment of the torque calibrating device is illustrated and indicated generally by the reference numeral 70. The device 70 employs the moment-beam 42 and block 44 of the embodiment of FIG. 1 and also has the strap 56 which is attached at one end thereof to the insert 54 at the lower end of block 44 by means of a suitable clamping plate and pin indicated generally at 72. The clamping means 72 is similar to the clamping means comprising plate 58 and pin 60 illustrated in FIG. 2.

The upper end of strap 56 is attached to the tension member 74 by means of a clamping means indicated generally at 76 which comprises a cylindrical pin and plate similar to the clamping means 64 of FIG. 2. The tension member 74 has the upper end thereof connected to a calibrated standard laboratory load cell 78 which may comprise a tension transducer employing electrical resistance strain gauges and having a predetermined precise output for a given tension load on member 74. The standard load cell 78 has the upper end thereof pivotally anchored to a portion 20 of the base means as indicated in FIG. 3.

In operation of the embodiment of FIG. 3, the hydraulic cylinder 40 is actuated to pull downwardly on input lever or beam 32 to apply an increasing torque to transducer "T", thereby developing tension in strap means 56 and in the load transducer 78 until a desired load output reading is obtained on the standard load cell 78. The output reading of the standard load cell 78 may then be compared with the output reading of the transducer "T"; and, the difference is noted as the error in transducer "T". Those skilled in the art will recognize an advantage of the present invention as applied to the FIG. 3 embodiment is that the moveable load application tangent point of strap 56 against curved loading surface 50 eliminates the need to accurately locate the load cell reaction member attachment cell directly vertically above the point of attachment to arm 42 as is the case in prior devices employing pinned connection of the standard load cell to beam 42.

The present invention thus provides a novel torque calibration stand capable of applying calibration loads in the order of 300,000 inch-pounds to an electrical torque transducer for calibrating the transducer in a known mode. The calibration stand of the present invention utilizes a load moment-arm having a curved loading surface with a constant radius equal to the distance of the loading surface from the torque axis. A thin carbon steel strap is attached at an end thereof to the loading surface and tensioned thereagainst to provide a moving tangent load-point for the tension load of the strap when maintained vertical under deadweight loading.

The present invention although described herein with respect to the illustrated embodiments is capable of modification and variation which will occur to those skilled in the art; and, the invention is limited only by the following claims.

I claim:

1. A device for calibrating torque transducers comprising;
   (a) base means;
   (b) input lever means mounted on said base means for pivotal movement about a torque axis;
   (c) load lever means mounted on said base means for pivotal movement about said torque axis and spaced from said first lever means;
   (d) input shaft means connected to said input lever means and adapted for connection to one end of a transducer to be calibrated;
   (e) load shaft means connected to said load lever means and adapted for connection to the opposite end of said transducer;
   (f) actuator means operatively connected to apply a load to said input lever means for applying a torque about said axis to said one end of said transducer;
   (g) block means attached to said output lever means and defining a curved loading surface having a substantially constant radius of curvature equal to the distance of said surface from said axis;
   (h) elongated strap means having a thickness substantially less than the width thereof with one end attached to said output lever means with one side of said strap means moveably contacting said loading surface, said strap means having the other end thereof attached to a desired amount of deadweight, wherein, upon application of load by said actuator means, the torque applied to said transducer to be calibrated is resisted by tension loading of said strap means in lifting said deadweight load whereupon said strap means assumes a vertical orientation and applies said deadweight load about a moveable tangential point on said surface as said load lever means is pivoted about said torque axis, said moveable point being maintained at a constant radius from said torque axis.

2. The calibrating device defined in claim 1, wherein said actuator means includes a hydraulic cylinder and piston pivotably attached to said input lever means.

3. The calibrating device defined in claim 1, wherein the ratio R/t of the radius of curvature R of the loading surface to the thickness "t" of said strap means is in the range 600 less than or equal to R/t less than or equal to 4000.

4. The calibrating device defined in claim 1, wherein the ratio R/t of the radius of curvature R of said loading surface to the thickness t of said strap means is at least 600.

5. The calibrating device defined in claim 1, wherein said strap means has a width to thickness ratio (W/t) of at least 30 (W/t $\geq$ 30).

6. The calibrating device defined in claim 1, wherein said strap means is formed of high carbon steel having a yield stress of at least 100 KSI (6,895 Kilopascals).

7. The calibrating device defined in claim 1, wherein said strap means include;
   (a) a metal strap having the width thereof substantially greater than the thickness thereof;
   (b) clamping means for retaining one end of said strap against said loading surface, said clamping means comprising secondary surface portions,
      (i) formed in said loading surface deviating from said constant curvature;
      (ii) plate means and fastening means therefor operable to exert a clamping force on said strap against said secondary surface for retaining said strap against said loading surface in a manner frictionally resisting tension loading applied to said strap.

8. A device for calibrating torque transducers comprising:
   (a) base means;
   (b) input lever means mounted on said base means for pivotal movement about a torque axis;
   (c) load lever means mounted on said base means for pivotal movement about said torque axis and spaced from said first lever means;
   (d) input shaft means connected to said input lever means and adapted for connection to one end of a transducer to be calibrated;
   (e) load shaft means connected to said load lever means and adapted for connection to the opposite end of said transducer;
   (f) block means attached to said output lever means and defining a curved loading surface having a substantially constant radius of curvature equal to the distance of said surface from said torque axis;
   (g) elongated strap means having a thickness substantially less than the width thereof with one end attached to said output lever means with one side of said strap means contacting said loading surface at a moveable point of tangency therealong;
   (h) reference load cell means having a predetermined accuracy and having the rexaining end of said strap means connected to the load input of said reference load cell with the reaction output of said reference load cell means connected to said base means;
   (i) actuator means connected to said base means and said input lever means, said actuator means operative to apply a load to said input shaft means for torquing the said transducer to be calibrated; wherein, upon application of load by said actuator means to said input lever means, said transducer to be calibrated is torqued about said axis and said strap means is tensioned about a moveable point on said loading surface to load said reference load cell, said moveable point remaining a constant radius from said torque axis.

* * * * *